Aug. 5, 1924.
T. A. BARKER
1,503,681
TRANSMISSION HOUSING AND SUPPORT THEREFOR
Filed Jan. 2, 1923
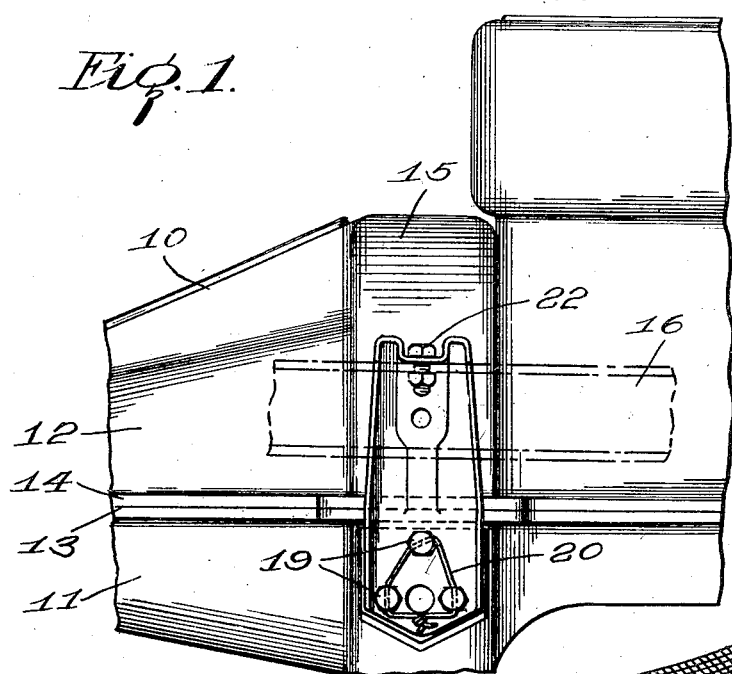
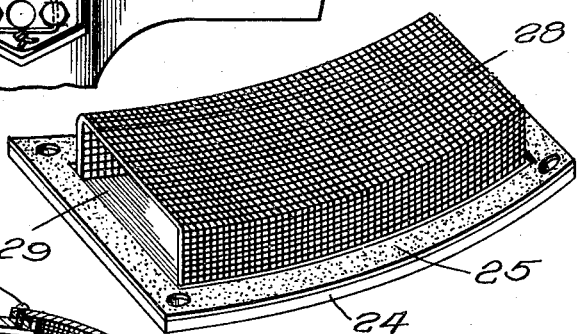
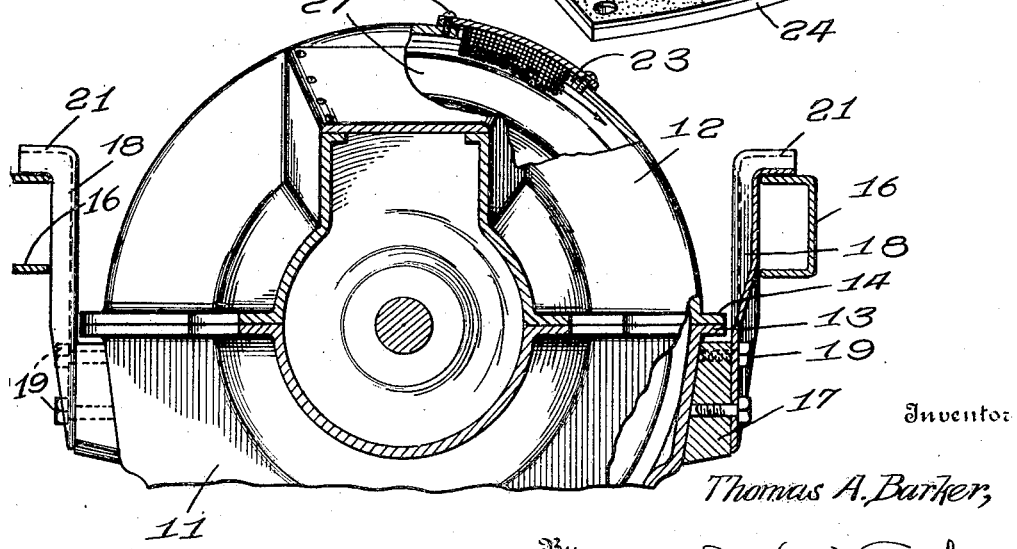
Inventor
Thomas A. Barker,
By J. A. Newton
Attorney Patented Aug. 5, 1924.

1,503,681

UNITED STATES PATENT OFFICE.

THOMAS A. BARKER, OF YATESVILLE, GEORGIA.

TRANSMISSION HOUSING AND SUPPORT THEREFOR.

Application filed January 2, 1923. Serial No. 610,305.

*To all whom it may concern:*

Be it known that I, THOMAS A. BARKER, a citizen of the United States, residing at Yatesville, in the county of Upson and State of Georgia, have invented certain new and useful Improvements in Transmission Housings and Supports Therefor, of which the following is a specification.

This invention relates to automobiles, and has special reference to the type of automobile, known as the Ford automobile.

More particularly the invention relates to improved means for supporting the transmission housing of such an automobile, and to means for preventing the clogging of the oil in such transmission housing by foreign matters such as fibers and flock from the brake band common in such engines.

In the supports which serve to connect the transmission housings of such automobiles with the longitudinal frame members of the chassis, as now manufactured, these supports are offset intermediate their ends so as to enable the lower part of the support to engage the lower half of the housing beneath the flange at the top of said lower half. This construction is defective because of the fact that the support or hanger, being thus offset, is weak at the sharp bend which extends beneath the flange of the housing. Also the connection of the lower end of this hanger, being usually accomplished by bolts or rivets through the relatively thin side wall of the housing, frequently breaks out by pulling the heads of the bolts or rivets through this thin side wall. Another disadvantage resides in the fact that whenever such pulling out occurs, it becomes necessary to remove the entire housing in order to replace a broken hanger, and this operation is one which takes much time and is attendant with a great deal of difficulty.

One of the most important objects of the present invention is to provide a novel form of hanger and means for connecting the same to the transmission housing of the engine, such arrangement being of such character that the lower and upper parts of the hanger will be in vertical alinement, and will thus be without the weakening and inconvenient offset.

Furthermore, in engines of this type, there is employed a brake band which engages on a brake drum within the transmission housing. Now since this housing is partly filled with oil, the flock and fibers from this brake band, as they are rubbed off, drop down in the oil and consequently tend to clog the oil system.

Another important object of the invention is to provide an improved automatic strainer arrangement wherein the oil will be passed during the running of the engine, automatically through the strainer which will remove the foreign matter, such as flock and fibers from the oil.

With these and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Fig. 1 is a side elevation of a portion of the automobile engine showing the improved hanger in position thereon.

Fig. 2 is a transverse view of the housing partly in elevation and partly in section, showing the improved hanger and strainer arrangement.

Fig. 3 is a perspective view of the strainer removed from the housing and inverted, the view being to an enlarged scale.

In the drawings it will be seen that there is disclosed a transmission housing 10, having a lower half 11 and upper half 12, which are provided with confronting flanges 13 and 14 respectively, so that these two halves of the housing may be held together by suitable bolts. At the forward end of this housing, there is a substantially circular enlargement 15 wherein runs the fly wheel and magneto of the machine, and it is that this part of the housing that the support is afforded in the automobiles in question. In order that the hangers which attach this housing to the longitudinal frame members 16 may extend straight down beside said frame members, there is provided beneath the flange 13 at each side of the portion 15 a hanger block 17 which is brazed or otherwise firmly secured to the side wall of the lower half of the housing. This hanger block has its inner face shaped to conform to the shape of the housing, while its outer face extends vertically and is located slightly beyond the outer limits of the flange 13 so that the lower end of the vertical leg 18 of the hanger may extend down alongside of this outer face, and be firmly secured thereto by suitable bolts 19, these bolts being prevented from unscrewing by a lock wire 20 passing through the heads of the several bolts, as clearly shown in Fig. 1. It will be observed that the upper end of the hanger extends at right angles as at 21 over the respective longitudinal frame members 16.

With this construction it will be seen that the supporting blocks 17 serve to reenforce the side walls of the housing while, in the event of breakage of a hanger or of one of the bolts 19, the hanger may be readily removed by removing the bolts 19 and the holding down bolt 22. It will be observed that the vertical portion of this hanger is without any offset, and consequently, the stresses exerted are in a straight line throughout its vertical portion, thus removing the tendency to break through a sharp bend, and the straight shape of the hanger lends itself readily to replacement and repair.

In connection with this improvement, it is also proposed to improve the construction, as above noted, by the use of an automatic strainer, and to this end, there is provided in the upper part of the housing portion 15, to one side of the center, a suitable opening of rectangular form, as at 23. Covering this opening is a curved plate 24 having a felt or other like gasket 25 on its underside, such plate being secured in position by suitable screws 26. On the underside of this plate and projecting into the housing closely adjacent the fly wheel 27 is a curved strainer which consists of a reticulated metal box 28 having its top closed by the plate 24, and one end open as at 29, said open end facing the direction of rotation of the fly wheel 27. With this arrangement, the rotation of the fly wheel picks up the oil from the bottom of the casing, and throws it off near the top by centrifugal force, such oil being thrown into the open end 29 of the strainer from whence it will run back down to the bottom portion of the housing. As the oil passes through the strainer, it is obvious that the flock and fibers contained therein will be separated and retained in such strainer which may be removed from time to time for cleaning out. Thus the running of the engine automatically frees the oil from contamination.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. The combination with the longitudinal frame members of an automobile and the transmission housing thereof; of means to support the transmission housing from said longitudinal frame members comprising distance blocks fixedly secured to the sides of the housing and having their outer surfaces substantially vertical, hangers each having a vertical leg bearing at its lower portion against the outer surfaces of the respective distance blocks, and a horizontal leg extending over the top of the longitudinal frame member, and means for detachably securing said hangers to said frame members and distance blocks.

2. The combination with longitudinal frame members of an automobile and a transmission housing for the automobile having a lateral flange, of distance blocks fixed to said transmission housing below said flange, said distance blocks having their inner surfaces conforming to the shape of the housing and their outer surfaces vertical and positioned beyond the outer edges of the flange, hangers each having a vertical leg and a horizontal leg, means for detachably securing the lower end of the vertical leg of each hanger to a respective distance block, and other means for detachably securing the horizontal leg of said hanger to a respective longitudinal frame member.

In testimony whereof I hereunto affix my signature.

THOMAS A. BARKER.